United States Patent [19]

Georgiou et al.

[11] Patent Number: 6,032,245

[45] Date of Patent: *Feb. 29, 2000

[54] METHOD AND SYSTEM FOR INTERRUPT HANDLING IN A MULTI-PROCESSOR COMPUTER SYSTEM EXECUTING SPECULATIVE INSTRUCTION THREADS

[75] Inventors: Christos John Georgiou, White Plains; Daniel A. Prener, Croton-on-Hudson, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/914,301

[22] Filed: Aug. 18, 1997

[51] Int. Cl.$^7$ ...................................................... G06F 9/30
[52] U.S. Cl. ................................ 712/23; 712/26; 712/30; 710/260; 710/261
[58] Field of Search ........................ 395/800.23, 800.34, 395/800.3, 856, 859, 860, 867, 733, 734, 736, 740, 741; 712/23, 34, 30, 36, 39, 40, 26; 710/46, 47, 48, 49, 260, 261

[56] References Cited

U.S. PATENT DOCUMENTS

| | | | |
|---|---|---|---|
| 5,179,702 | 1/1993 | Spix et al. | 395/650 |
| 5,283,904 | 2/1994 | Carson et al. | 395/725 |
| 5,627,992 | 5/1997 | Baror | 395/460 |
| 5,701,496 | 12/1997 | Nizar et al. | 395/739 |
| 5,812,811 | 9/1998 | Dubey et al. | 395/392 |

*Primary Examiner*—John A. Follansbee
*Assistant Examiner*—Dzung C. Nguyen
*Attorney, Agent, or Firm*—Ratner & Prestia

[57] ABSTRACT

In the system bus controller of a multi-processor system, apparatus is provided for selecting one of the processors to handle an interrupt. A mask is provided for each respective task being executed on each one of the processors. Each mask includes a speculation bit identifying whether the task is speculative. Each mask includes a plurality of class enable bits identifying whether the task can be interrupted by a respective class of interrupts associated with each of the plurality of class enable bits. Control lines in the system bus receive an interrupt having a received interrupt class. A subset of the processors is identified; processors in the subset can be interrupted by the received interrupt based on the received interrupt class and the respective speculation bit and class enable bits assigned to the task being executed on each respective processor. A Boolean AND operation is performed on the mask associated with the respective task executing on each processor. The AND operation is performed on the speculation bit and the class enable bit which corresponds to the received interrupt class, so as to determine whether that processor is included in the subset. One of the processors in the subset is selected to process the received interrupt, if the subset includes at least one processor.

30 Claims, 4 Drawing Sheets

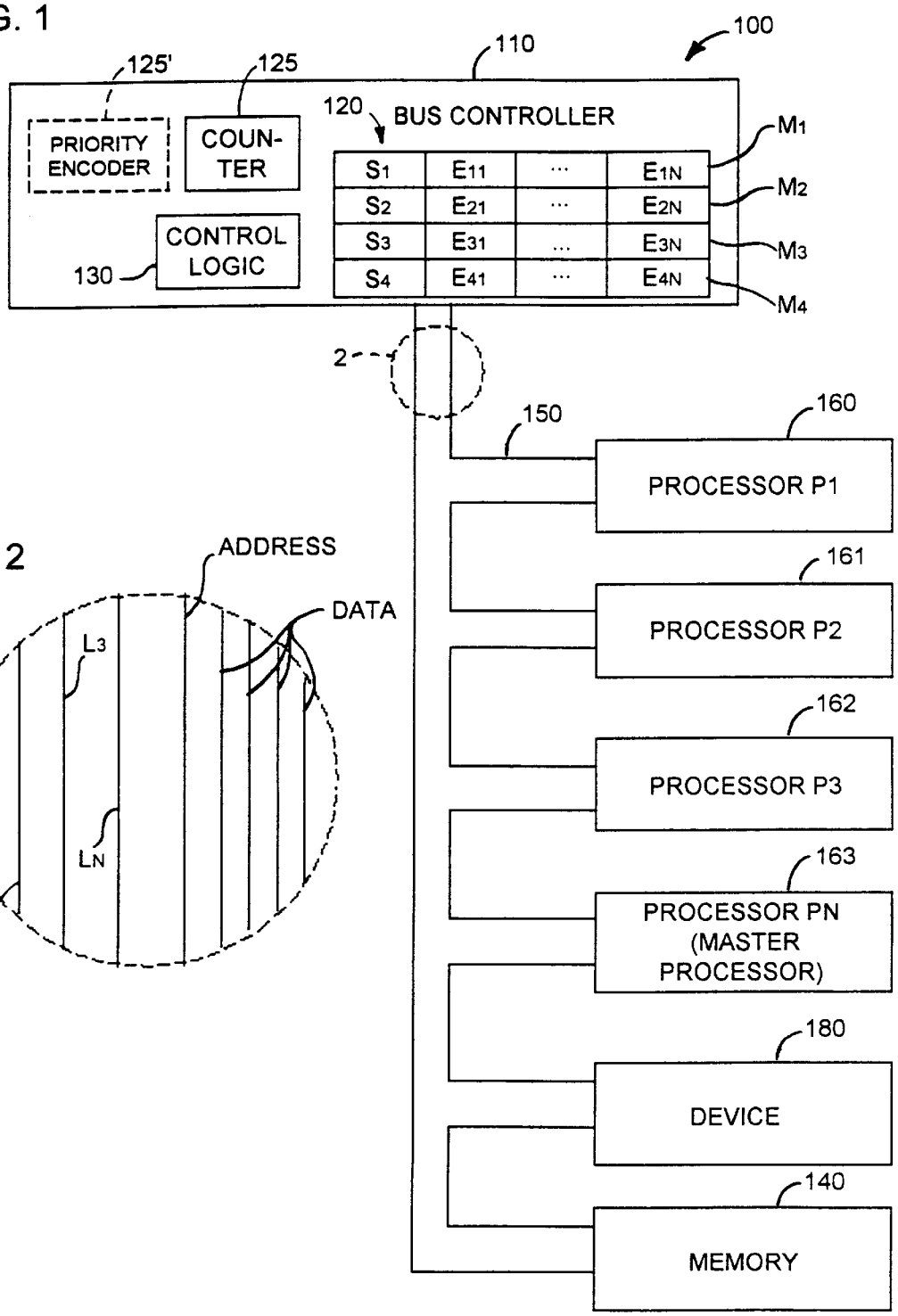

METHOD AND SYSTEM FOR INTERRUPT HANDLING IN A MULTI-PROCESSOR COMPUTER SYSTEM EXECUTING SPECULATIVE INSTRUCTION THREADS

FIELD OF THE INVENTION

The present invention relates to multi-processor computer systems generally, and in particular to systems and methods for distributing interrupt handling tasks in a multiprocessor environment.

BACKGROUND OF THE INVENTION

In multi-processor systems, a number of different methods may be used to determine which processor handles an external interrupt. Some of these methods may only produce a single choice. For example, in asymmetric systems, all interrupts are handled by a designated processor; in other systems each external device capable of causing an interrupt is connected to only one processor and can interrupt only the processor to which it is connected.

Other methods produce a set of processors which are capable of handling a given external interrupt. For example, all processors which have not disabled a given interrupt may be included in the set; one of the processors is selected from that set. A variety of algorithms may be used to perform this selection, such as a simple round-robin scheme in which each processor is selected sequentially to handle an interrupt.

Improved methods and systems for distributing the interrupt handling tasks are desired to improve parallelism in multi-processor systems.

SUMMARY OF THE INVENTION

The present invention is a method for selecting one of a plurality of processors to process an interrupt, in a multi-processor system. For each respective task assigned to be executed on each one of the plurality of processors, a first attribute identifies whether the task is speculative; at least one second attribute identifies whether the task can be interrupted by a respective class of interrupts associated with the second attribute. An interrupt having a received interrupt class is received. A subset of the plurality of processors is identified. The processors identified are those that can be interrupted by the received interrupt based on the received interrupt class and the respective first and second attributes assigned to the respective task being executed on each respective processor. One of the processors in the subset is selected to process the received interrupt, if the subset includes at least one processor.

BRIEF DESCRIPTION OF THE DRAWINGS

FIG. 1 is a block diagram of a first exemplary system according to the invention.

FIG. 2 is an detailed view of the bus shown in FIG. 1.

OVERVIEW

Figure 3:
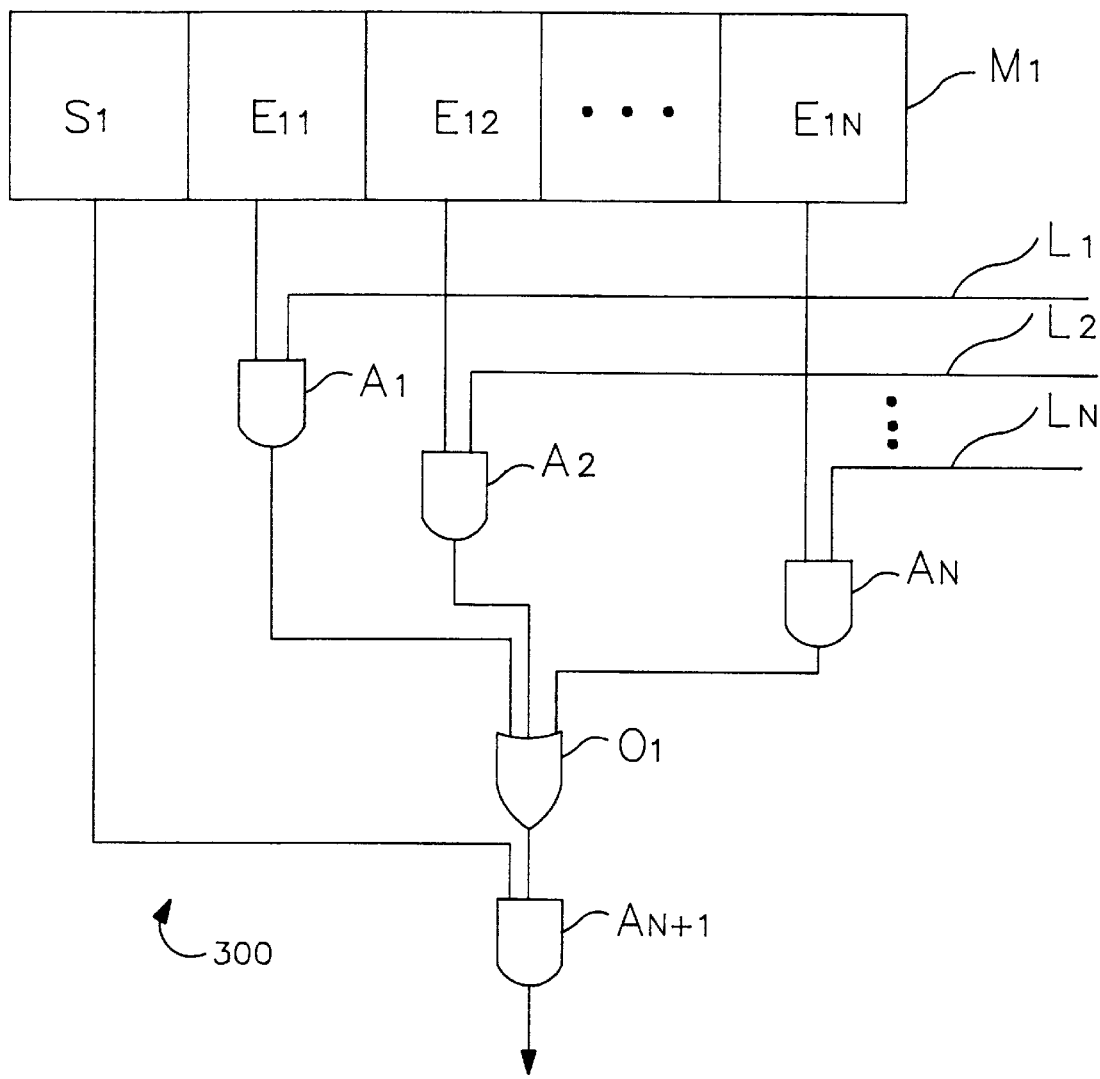
FIG. 3 is a schematic diagram of a logic circuit for determining whether one of the processors shown in FIG. 1 is a candidate to handle an interrupt.

The present invention is embodied in apparatus for selecting one of a plurality of processors to process an interrupt, in a multi-processor system.

FIG. 1 is a block diagram showing a first exemplary multi-processor system 100 according to the invention. A multi-processor is a machine with more than one processor 160–163. These processors 160–163 may be connected to each other by a bus 150 or by a cross bar switch (Shown in FIG. 5.) Each of the processors 160–163 may have its own cache (not shown).

The processors 160–163 share a common memory 140 via the bus 150 (or cross bar switch). Each processor 160–163 may have additional private memory (not shown) that is not accessible to the other processors. Each processor 160–163 may execute its own task (e.g., an audio application may run on one processor and a video application may run on another processor). In this case, each processor 160–163 executes its task without any strong interaction with tasks running on other processors. In other cases, a single task may be broken up into sub-tasks that are executed cooperatively on one or more processors by assigning the sub-tasks to the one or more processors.

A bus controller 110 decides which processor 160–163 can access the bus 150 at any given time. In addition, one of the processors 163 serves as the master processor. The master processor 163 generates and distributes the tasks to other processors 160–162, and also executes tasks on its own.

U.S. application Ser. No. 08/383,331 by P. K. Dubey et al., filed Feb. 3, 1995, now U.S. Pat. No. 5,812,811, is hereby incorporated by reference in its entirety. Dubey et al. describe a method for executing speculative parallel instruction threads. In the exemplary embodiment of the invention, the microprocessors 160–163 contain a form of control instruction (branch) prediction, called speculation. An instruction following a branch instruction may be fetched and executed "speculatively," without waiting for the branch to be executed. This increases the amount of parallel execution in the application. When a thread of a program is run speculatively, there is chance that the thread will not be required at all. Thus there is a risk that that thread is executed unnecessarily.

The master processor 163 determines whether some or all of the instructions of a given speculative task must be discarded because the instructions are part of a thread which would only be needed under a set of conditions that turned out not to be present. Each processor 160–162 notifies the master processor 163 when the task which that processor is executing terminates. An example of the task distribution function of the master processor is described in U.S. patent application Ser. No. 08/383,331, by Dubey et al., referenced above.

According to the present invention, performance in a multiprocessor system is enhanced if interrupts are processed by processors executing speculative tasks rather than if the interrupts are processed by processors executing non-speculative tasks. This is because there is a probability that the program thread which is interrupted is only executed because of a mis-speculation (a bad guess), and that the results of the execution of that thread are not needed in any event. Thus, the invention provides a method and apparatus for directing interrupts towards a processor that is executing a speculative task whenever possible. Processors which are executing non-speculative tasks are not interrupted, so that the results from these processors (which are known to be necessary) are provided sooner.

FIG. 1 is a block diagram showing a first exemplary embodiment of the invention. System 100 is a multiprocessor system including a plurality of processors 160–163 (of which processor 163 is a master processor) coupled to a common system bus 150. System 100 is capable of multi-processing. That is, different threads, or portions, of a program execute on different processors 160–163 in parallel, each having its own program counter. One or more devices 180, such as the main memory, are also coupled to the system bus.

Means 120 are provided within the bus controller 110 for assigning first and second attributes to a respective task being executed on each one of the plurality of processors 160–163. The first attribute $S_1$, $S_2$, $S_3$, $S_4$ identifies whether the task is speculative, i.e., whether the task comprises instructions following a branch instruction that are fetched and executed speculatively, without waiting for the branch instruction to be executed. A plurality of second attributes $E_{11}$–$E_{41}$, $E_{12}$–$E_{42}$, ..., $E_{1N}$–$E_{4N}$ identify whether the task can be interrupted by a respective class of interrupts associated with the second attributes. In the exemplary embodiment, the first and second attributes are stored in a high speed memory 120 within bus controller 110.

In FIG. 1, each column of second attributes in the attribute assigning means 120 corresponds to a respectively different class of interrupt, $C_j$. Thus, $E_{11}$ to $E_{41}$ correspond to interrupt class $C_1$; $E_{1N}$ to $E_{4N}$ correspond to interrupt class $C_N$. Each row $M_1$ to $M_4$ in the attribute assigning means corresponds to a task executing on a respectively different processor. Thus, $S_1$ to $E_{1N}$ corresponds to the task running in Processor 160; $S_4$ to $E_{4N}$ correspond to the task running on Processor 163. One of ordinary skill in the art recognizes that, although the example shown in FIG. 1 corresponds to a system having four tasks (which are executing on processors 160–163 respectively, and a respective row $M_1$–$M_4$ corresponding to each processor 160–163), the invention may be practiced using any number X of tasks, executing on X processors, with X rows $M_1$–$M_x$.

In the exemplary embodiment, each row of the attribute assigning means 120 represents a respective mask $M_1$ to $M_4$. Bus controller stores a respective mask $M_1$ to $M_4$ for each respective task being executed on each one of the plurality of processors 160–163. Each mask $M_1$ to $M_4$ includes a speculation bit $S_1$ to $S_4$, respectively. The speculation bit $S_1$ to $S_4$ identifies whether the task is speculative (the value of the bit is set to "1") or non-speculative (the value of the bit is set to "0"). Each mask $M_1$ to $M_4$ further includes a plurality of class enable bits $E_{ij}$. Each class enable bit Eij identifies whether the task i can be interrupted by a respective class of interrupts $C_j$.

Bus 150 provides a means for receiving an interrupt signal (referred to hereinafter as "an interrupt"). The interrupt may, for example, be transmitted from an external device, such as device 180. The received interrupt has a received interrupt class, $C_1$ to $C_N$. As shown in detail in FIG. 2, bus 150 includes data lines, which typically correspond to the number of bits in a data word (e.g., 16 or 32 bits wide). Address lines are also provided. A plurality of control lines are provided, including a respective line for each class $C_1$ to $C_N$ of interrupt that is processed in the system 100.

As described in detail below with reference to FIG. 3, means 300 are provided for identifying a subset of the plurality of processors 160–163 that can be interrupted by the received interrupt. The identification of the candidate processors in the subset is based on the received interrupt class and the respective first attribute (e.g., S1) and second attributes (e.g., $E_{11}$ to $E_{1N}$) assigned to the respective task being executed on each respective processor.

The identifying means 300 of FIG. 3 only include in the candidate subset the processors that are executing speculative tasks, based on the first attribute $S_1$ to $S_4$. Further, the identifying means only include in the subset the processors that are executing tasks for which the second attribute $E_{ij}$ indicates that the task can be interrupted by an interrupt of the received interrupt class $C_j$. In the exemplary embodiment, a processor i is included in the candidate subset for handling an interrupt of class $C_j$ if the speculation bit Si and the enable bit $E_{ij}$ for the task i executing on processor i are both set to the value "1."

Means are provided for selecting one of the processors in the candidate subset to process the received interrupt, if the subset includes at least one processor. Further, if none of the processors is executing a speculative task, one of the processors executing an non-speculative task is selected to handle the interrupt. In other words, means are provided for selecting a processor that can be interrupted by an interrupt of the received interrupt class Cj, based on the second attribute of the task, if the subset is empty (even if that processor is executing a non-speculative task). In the exemplary embodiment, the selecting means may be implemented by a simple hardware implemented algorithm, or, alternatively, via software executing in a processor (not shown).

According to another aspect of the invention described in detail below with reference to FIG. 4, each mask $M_i'$ may include at least two bits $E_{ij1}$ and $E_{ij2}$ for each respective class $C_j$ of interrupts. In this variation of the exemplary embodiment, each of the two bits $E_{ijk}$ corresponds to a respectively different priority level k for interrupt class $C_j$. In this variation, the identifying means performs a respective Boolean AND operation on the speculation bit and each one of the at least two bits, individually, for each respective mask means, similarly to the algorithm used when there is a single priority level.

These and other aspects of the invention are described below with reference to the figures and the detailed description of the exemplary embodiments.

DETAILED DESCRIPTION

According to the present invention, when the master processor 163 determines that a task can be assigned to one of the other processors 160 to 162 on the system bus 150, the master processor 163 transmits the task along with a mask $M_i$ to the bus controller 110 (If master processor 163, itself, is to execute the task, then master processor 163 still sends the mask $M_i$ to the bus controller 110). The mask $M_i$ contains a speculation bit $S_i$ and one or more enable bits $E_{ij}$. The speculation bit $S_i$ (set to a value of "1" or "0") identifies whether the task is a regular, non-speculative task ($S_i$=0) or a speculative task ($S_i$=1). Each enable bit $E_{ij}$ (set to 1 or 0) is associated with a class $C_j$ of interrupts and identifies whether the task i can be interrupted by an interrupt belong to class $C_j$.

Preferably, the masks $M_i$ are stored by the bus controller 110 in high speed memory 120 and the task is comnunicated to the target processor 160–162. The information communicated to begin a task comprises the internal state that the target processor 160–163 is to assume. This preferably includes address translation information, such as the contents of TLB's (translation look-aside buffers), the contents of registers, and the program counter. Upon receipt, the target processor starts executing instructions at the address specified by the program counter using the communicated state.

An external interrupt signals the occurrence of some asynchronous (i.e., not caused by the executing instructions)

event which requires a processor's attention. Examples of external interrupts include completion of processor-initiated I/O operation; error in I/O operation; request for attention from an external device 180 (e.g., a timer going off, a key being pressed, data arriving from a network). Interrupt signals are communicated between external devices 180, the bus controller 110 and the processors 160–163 over interrupt control lines $L_1, L_2, L_3, \ldots, L_N$ that are incorporated as part of the bus 150. More specifically, as shown in FIG. 2, for each class $C_j$ of interrupt (or equivalently, for each enable bit $E_{ij}$ in the interrupt mask $M_i$) there is a line $L_j$ connecting the external devices 180 to the bus controller 110, and another line from the bus controller to each processor 160–163. An interrupt is received by the bus controller 110 where it is examined. The bus controller 110 examines the type (i.e., class and/or priority) of interrupt and compares it against the processor mask bits stored in its high speed memory 120 in order to ascertain which processor 160–163 should handle the interrupt.

More specifically, when an interrupt is received by bus controller 110, the bus controller 110 determines to which class $C_j$ the interrupt belongs. Then, the processor that will handle the interrupt is selected as follows. First, the set of preferred processors that satisfy the following logical operation is computed based on the following Boolean AND operation. $M_i$ is an element of the candidate subset if:

$S_i$ AND $E_{ij}$="1"

FIG. 3 is a schematic diagram of an exemplary circuit for performing the above mentioned AND operation. Means 300 are provided for performing a Boolean AND operation on the mask associated with the respective task executing on each processor. The AND operation is performed on the speculation bit $S_i$ and the class enable bit $E_{ij}$ which corresponds to the received interrupt class $C_j$, thereby to determine whether the processor i executing task i is included in the candidate subset.

The receipt of an interrupt of class $C_j$ is indicated when the signal on the line Lj associated with interrupt class $C_j$ is set to the value "1." If task i can be interrupted by an interrupt in class $C_j$, then the enable bit $E_{ij}$ is set to a value of "1." When the value of the signal on line $L_j$ is set to "1", corresponding AND gate $A_j$ performs a Boolean AND operation on the output signal of the enable bit $E_{ij}$ and the line $L_j$. If the signals on both $E_{ij}$ and $L_j$ are set to "1", then a value of "1" is provided at the output terminal of AND gate $A_j$. The output signals from the AND gates $A_1$–$A_N$ are transmitted to the inputs of an OR gate $O_1$. When one of the AND gates $A_1$–$A_N$ outputs a value of "1," and the speculation bit $S_i$ is set to "1," AND gate $A_{N+1}$ outputs a value of "1," indicating that the processor i executing task i is to be included in the candidate subset of processors to handle the interrupt.

A respective circuit similar to that shown in FIG. 3 may be provided for the respective mask associated with each processor 160–163. Each of these circuits provides an output signal from its AND gate $A_{N+1}$, indicating whether the corresponding processor is a candidate for handling the interrupt. The Boolean AND operations may be performed for each processor 160–163 simultaneously.

Thus, each processor i in the set of preferred processors is executing speculatively ($S_i$=1) and has been enabled to handle the class $C_j$ of interrupts corresponding to the particular interrupt ($E_{ij}$=1). If the set of preferred processors is non-empty, then one of the processor in the set of preferred processors is identified as the processor that will handle the interrupt. The selected processor is designated the Interrupt Handling Processor (IHP). If this set is empty, then a candidate subset may be formed to include any processor executing a non-speculative task with the enable bit $E_{ij}$=1. In either case, if there are more than one processors in the candidate subset, the method of choosing one from among multiple candidates may be the same as would be used in the absence of speculation.

For example the selecting means may use a counter 125 to implement a round-robin algorithm within the bus controller 110. Each time an interrupt is handled, the counter 125 is incremented by one. If the value output by the counter is i, and processor i is within the candidate subset, then processor i is selected as the IHP. If processor i is not within the candidate subset, then the counter is incremented again, and the next processor within the candidate subset is selected as the IHP. Once the output of counter 125 reaches the number N of processors, the counter 125 is reset.

Alternatively, instead of a round robin scheme, the selecting means may include a priority encoder circuit 125'. The output signal from AND gate $A_{N+1}$ of the circuit 300 corresponding to each respective processor may be fed into a priority encoder circuit 125'. The priority encoder circuit 125' receives the output signals and generates an address which is used to select one of the processors to handle the interrupt. The priority encoder 125' may be a conventional priority encoder circuit.

Once the IHP is selected, the interrupt is handled by the IHP. The bus controller 110 notifies the master processor 163 that the current task being executed by the IHP is being interrupted. The master processor 163 marks the task currently being executed by the IHP as not-yet-issued, and puts the task back into its queue of tasks to be issued. The IHP processor then handles the interrupt using conventional uni-processor interrupt architecture. More specifically, the IHP changes to supervisor state, records the value of its program counter (so that it can later resume the interrupted program), and begins executing instructions from the address designated for interrupt class $C_j$.

To illustrate the operation of the present invention, consider an exemplary system having four processors P1, P2, P3, P4. In addition, an interrupt identifying completion of a disk operation is assigned to a first class $C_1$ of interrupts, and an interrupt identifying detection of a memory error is assigned to a second class $C_2$. Moreover, the master processor 163 has assigned a respective mask $M_1$–$M_4$ to each of the four processors as follows:

TABLE 1

| Processor | Masks | | |
| --- | --- | --- | --- |
|  | $S_i$ | $E_{i1}$ | $E_{i2}$ |
| P1 | 1 | 1 | 0 |
| P2 | 1 | 0 | 1 |
| P3 | 0 | 1 | 0 |
| P4 | 0 | 0 | 1 |

In this example, the processor P1 is executing a speculative task ($S_1$=1). Thus processor P1 can be interrupted by an interrupt belonging to class $C_1$ ($E_{11}$=1), but cannot be interrupted by an interrupt belong to class $C_2$ ($E_{12}$=0). The processor P2 is executing a speculative task ($S_2$=1); Processor P2 cannot be interrupted by an interrupt belonging to class $C_1$ ($E_{21}$=0), but can be interrupted by an interrupt belong to class $C_2$ ($E_{22}$=1). The processor P3 is executing a non-speculative task ($S_3$=0); processor P3 can be interrupted by an interrupt belonging to class $C_1$ ($E_{31}$=1), but cannot be interrupted by an interrupt belonging to class $C_2$ ($E_{32}$=0). Finally, the processor P4 is executing a non-speculative task ($S_4=0$). Processor P4 cannot be interrupted by an interrupt belonging to class $C_1$ ($E_{41}=0$), but can be interrupted by an interrupt belong to class $C_2$ ($E_{42}=1$).

If an interrupt identifying completion of a disk operation (assigned to the class $C_1$) is received, the bus controller 110 determines that the interrupt belongs to class $C_1$ and computes the candidate subset of preferred processors by analyzing the speculation bit $S_i$ and enable bit $E_{i1}$, which is associated with the class $C_1$, for the four processors. Preferably, the bus controller 110 identifies the set of preferred processors that satisfy the operation: $S_i=1$ AND $E_{i1}=1$. In this example, the Boolean AND operation only yields an output value of "1" for processor P1. Thus, the set of preferred processors includes only processor P1, and processor P1 is designated the IHP to handle the interrupt. The bus controller 110 then notifies the master processor 163 that the current task being executed by the IHP (P1) is being interrupted. The master processor 163 marks the task currently being executed by the IHP (processor P1) as not-yet-issued, and puts the task back into its queue of tasks to be issued. The IHP processor (P1) then handles the interrupt using conventional uni-processor interrupt architecture.

If an interrupt identifying detection of a memory error (assigned to the class $C_2$) is experienced, the bus controller determines that the interrupt belongs to class $C_2$ and computes the set of preferred processors by analyzing the speculation bit $S_i$ and enable bit $E_{i2}$, which is associated with the class $C_2$, for the four processors. Preferably, the bus controller 110 identifies the set of preferred processor that satisfy the operation: $S_i=1$ AND $E_{i2}=1$. In this example, the Boolean AND operation only yields an output value of "1" for processor P2. Thus, the set of preferred processors includes only processor P2, and processor P2 is designated the IHP to handle the interrupt. The bus controller 110 then notifies the master processor 163 that the current task being executed by the IHP (processor P2) is being interrupted. The master processor marks the task currently being executed by the IHP (P2) as not-yet-issued, and puts the task back into its queue of tasks to be issued. The IHP processor (P2) then handles the interrupt using conventional uni-processor interrupt architecture.

Figure 4:
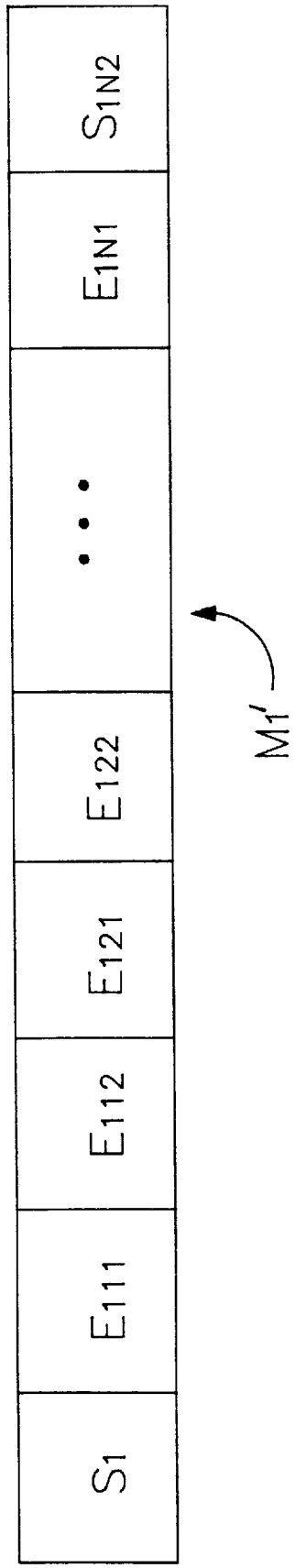
FIG. 4 is a diagram of a variation of the mask shown in FIG. 3.

FIG. 4 shows a variation of the mask. In mask $M_1'$ of FIG. 4, multiple bits $E_{ij1}$, $E_{ij2}$ are associated with a given class $C_j$ and indicate different levels of interruption (for example, the multiple bits $E_{ijk}$ may be used to indicate that a task i is interruptable by an interrupt in class $C_j$, but only by interrupts of sufficiently high priority $\geq k$).

Figure 5:
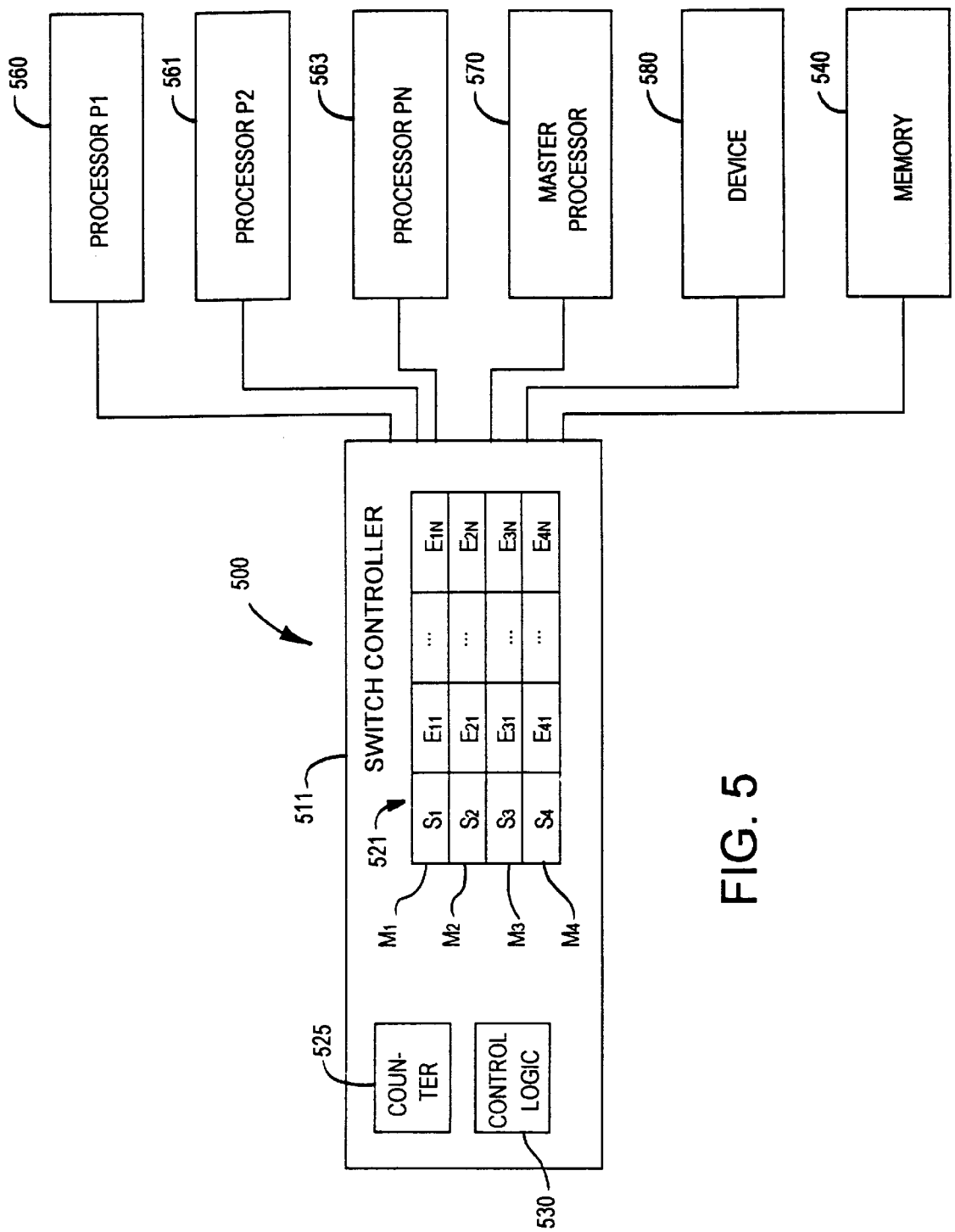
FIG. 5 is a block diagram of a second exemplary system according to the invention.

The present invention may be practiced in a variety of hardware architectures. For example, the invention may also be used in a multi-processor system 500 as shown in FIG. 5, wherein. a cross-bar switch 550 (not a bus) is used to communicate among the processors 560–563, device 580 and memory 540. In this embodiment, a switch controller 511 receives and allocates tasks to the processors 160–163. In addition, the switch controller 511 stores the masks $M_1$–$M_N$ in a table 521 and includes the interrupt handling processing (control logic 530 and counter 525) as described above with reference to the embodiment of FIG. 1.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. In a multi-processor system, a method for selecting one of a plurality of processors to process an interrupt, comprising the steps of:

(a) assigning to a respective task being executed on each one of the plurality of processors, a first attribute identifying whether the task is speculative;

(b) assigning at least one second attribute to the respective task, the second attribute identifying whether the respective task can be interrupted by a respective class of interrupts associated with the second attribute;

(c) receiving an interrupt having a received interrupt class;

(d) identifying a subset of the plurality of processors that can be interrupted by the received interrupt based on both the respective first and second attributes assigned to the respective task being executed on each respective processor and the received interrupt class; and (e) selecting one of the processors in the subset to process the received interrupt, if the subset includes at least one processor.

2. A method according to claim 1, wherein step (d) includes:

(d1) including in the subset only the processors that are executing speculative tasks, based on the first attribute.

3. A method according to claim 2, wherein step (d) further includes:

(d2) including in the subset only the processors that are executing tasks for which the second attribute indicates that the task can be interrupted by an interrupt of the received interrupt class.

4. A method according to claim 2, further comprising:

(f) selecting a processor that can be interrupted by an interrupt of the received interrupt class, based on the second attribute of the task, if the subset is empty.

5. A method according to claim 1, wherein each task has a plurality of second attributes, each of the plurality of second attributes being associated with a respectively different class of interrupt.

6. A method according to claim 5, wherein:

step (a) includes transmitting to a control means a respective mask for each task, each mask including a plurality of data bits identifying the values of the first and second attributes for the task, and step (d) includes performing, for each processor, a Boolean AND operation on the mask associated with the respective task executing on that processor, the AND operation being performed on the first attribute and the second attribute which corresponds to the received interrupt class, thereby to determine whether that processor is included in the subset.

7. In a multi-processor system, apparatus for selecting one of a plurality of processors to process an interrupt, comprising the steps of:

means for assigning to a respective task being executed on each one of the plurality of processors, a first attribute identifying whether the task is speculative;

means for assigning at least one second attribute identifying whether the respective task can be interrupted by a respective class of interrupts associated with the second attribute;

means for receiving an interrupt having a received interrupt class;

means for identifying a subset of the plurality of processors that can be interrupted by the received interrupt based on both the respective first and second attributes assigned to the respective task being executed on each respective processor and the received interrupt class; and means for selecting one of the processors in the subset to process the received interrupt, if the subset includes at least one processor.

8. Apparatus according to claim 7, wherein the identifying means include:
means for including in the subset only the processors that are executing speculative tasks, based on the first attribute.

9. Apparatus according to claim 8, wherein the identifying means further include:
means for including in the subset only the processors that are executing tasks for which the second attribute indicates that the task can be interrupted by an interrupt of the received interrupt class.

10. Apparatus according to claim 8, further comprising:
means for selecting a processor that can be interrupted by an interrupt of the received interrupt class, based on the second attribute of the task, if the subset is empty.

11. Apparatus according to claim 7, wherein each task has a plurality of second attributes, each of the plurality of attributes being associated with a respectively different class of interrupt.

12. In a multi-processor system, apparatus for selecting one of a plurality of processors to process an interrupt, comprising the steps of:
mask means for each respective task being executed on each one of the plurality of processors, each mask means including a speculation bit identifying whether the task is speculative, and a plurality of class enable bits identifying whether the task can be interrupted by a respective class of interrupts associated with each of the plurality of class enable bits;
means for receiving an interrupt having a received interrupt class;
means for identifying a subset of the plurality of processors that can be interrupted by the received interrupt based on the received interrupt class and the respective speculation bit and class enable bits assigned to the respective task being executed on each respective processor, including
means for performing a Boolean AND operation on the mask means associated with the respective task executing on each processor, the AND operation being performed on the speculation bit and the class enable bit which corresponds to the received interrupt class, thereby to determine whether that processor is included in the subset; and
means for selecting one of the processors in the subset to process the received interrupt, if the subset includes at least one processor.

13. Apparatus according to claim 12, wherein the apparatus is included in a bus controller of the multi-processor system.

14. Apparatus according to claim 13, wherein the mask means are stored by the bus controller in a high speed memory.

15. Apparatus according to claim 13, wherein the interrupt receiving means include a plurality of lines, each line connecting a device to the bus controller, each respective line being used to transmit a respectively different class of interrupt to the bus controller.

16. Apparatus according to claim 12, wherein:
each mask means includes at least two bits for each respective class of interrupts, each of the at least two bits corresponding to a respectively different priority level for that class of interrupt, and the identifying means performs a respective Boolean AND operation on the speculation bit and each one of the at least two bits, individually, for each respective mask means.

17. In a multi-processor system, a method for selecting one of a plurality of processors to process an interrupt, comprising the steps of:
(a) setting a speculation identifier which indicates whether a respective task being executed on each one of the plurality of processors is a speculative task, wherein a speculative task is executed before it is known whether the results of its execution will be used;
(b) receiving an interrupt;
(c) identifying a subset of the plurality of processors that can be interrupted by the received interrupt by including in the subset ones of the plurality of processors which are executing the speculative tasks, based on the speculation identifier assigned to the respective task being executed on each respective processor; and
(d) selecting one of the processors in the subset to process the received interrupt, if the subset includes at least one processor.

18. A method according to claim 17, wherein the method includes the step of:
executing each one of a plurality of tasks on a different one of the plurality of processors, wherein at least one of the plurality of tasks is a speculative task.

19. A method according to claim 17, wherein:
step (a) further comprises assigning at least one attribute to each respective task, the at least one attribute identifying whether the respective task can be interrupted by a respective class of interrupts associated with the at least one attribute;
the interrupt has a received interrupt class; and
step (c) includes identifying the subset based on the received interrupt class and both the speculation identifier and the at least one attribute assigned to each task.

20. A method according to claim 19, wherein step (c) includes:
(c1) including in the subset only the processors that are executing speculative tasks, based on the speculation identifier.

21. A method according to claim 20, wherein step (c) further includes:
(c2) including in the subset only the processors that are executing tasks for which the at least one attribute indicates that the task can be interrupted by an interrupt of the received interrupt class.

22. A method according to claim 20, further comprising the following step:
(e) selecting a processor that can be interrupted by an interrupt of the received interrupt class, based on the at least one attribute of the task, if the subset is empty.

23. A method according to claim 19, wherein each task has a plurality of attributes, each of the plurality of attributes being associated with a respectively different class of interrupt.

24. A method according to claim 23, wherein:
step (a) includes transmitting to a control means a respective mask for each task, each mask including a plurality of data bits identifying the values of the speculation identifier and the plurality of attributes for the task, and
step (c) includes performing, for each processor, a Boolean AND operation on the mask associated with the respective task executing on that processor, the AND operation being performed on the speculation identifier and the attribute which corresponds to the received interrupt class, thereby to determine whether that processor is included in the subset.

25. In a multi-processor system, apparatus for selecting one of a plurality of processors to process an interrupt, comprising:

means for setting a speculation identifier which indicates whether a respective task being executed on each one of the plurality of processors is a speculative parallel task, wherein a speculative task is executed before it is known whether the results of its execution will be used;

means for receiving an interrupt;

identifying means for identifying a subset of the plurality of processors that can be interrupted by the received interrupt by including in the subset ones of the plurality of processors which are executing the speculative tasks, based on the speculation identifier assigned to the respective task being executed on each respective processor; and means for selecting one of the processors in the subset to process the received interrupt, if the subset includes at least one processor.

26. An apparatus according to claim 25 further comprising:

assigning means for assigning an attribute identifying whether the respective tasks can be interrupted by a respective class of interrupts associated with the attribute;

the received interrupt has a received interrupt class; and the identifying means includes means for identifying the subset based on the received interrupt class and both the speculation identifier and the attribute assigned to each task.

27. Apparatus according to claim 26, wherein the identifying means include:

means for including in the subset only the processors that are executing speculative tasks, based on the speculation identifier.

28. Apparatus according to claim 27, wherein the identifying means further include:

means for including in the subset only the processors that are executing tasks for which the attribute indicates that the task can be interrupted by an interrupt of the received interrupt class.

29. Apparatus according to claim 27, further comprising:

means for selecting a processor that can be interrupted by an interrupt of the received interrupt class, based on the attribute of the task, if the subset is empty.

30. Apparatus according to claim 26, wherein each task has a plurality of attributes, each of the plurality of attributes being associated with a respectively different class of interrupt.

* * * * *